R. B. WARE.
MACHINE FOR HANDLING COINS.
APPLICATION FILED JAN. 6, 1909. RENEWED SEPT. 13, 1911.
1,022,902.
Patented Apr. 9, 1912.
10 SHEETS—SHEET 2.
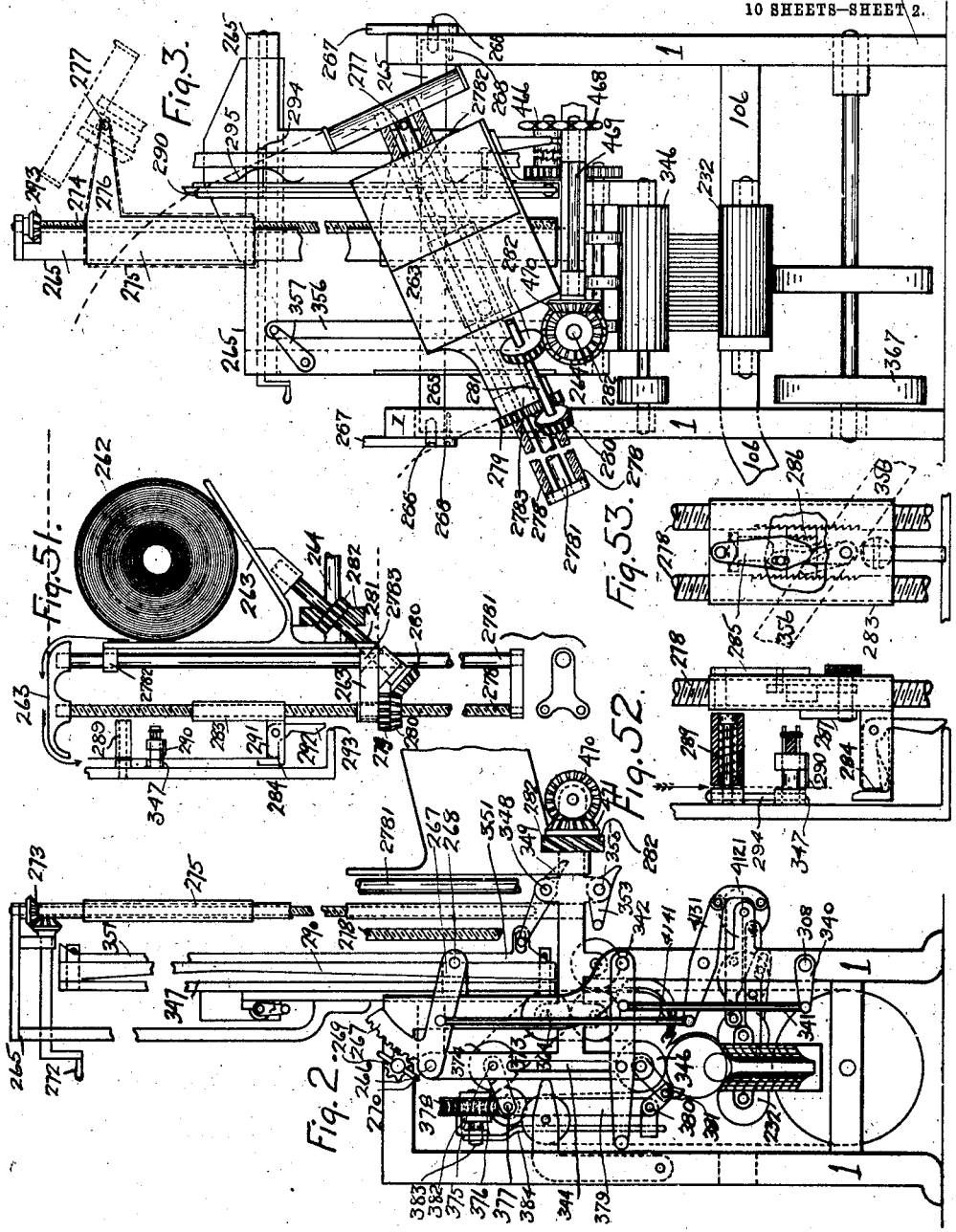
WITNESSES:
Ellen L. Ware
Marguerite Ross.
INVENTOR
Rodney Bradford Ware
BY
Edw. Van Winkle
ATTORNEY

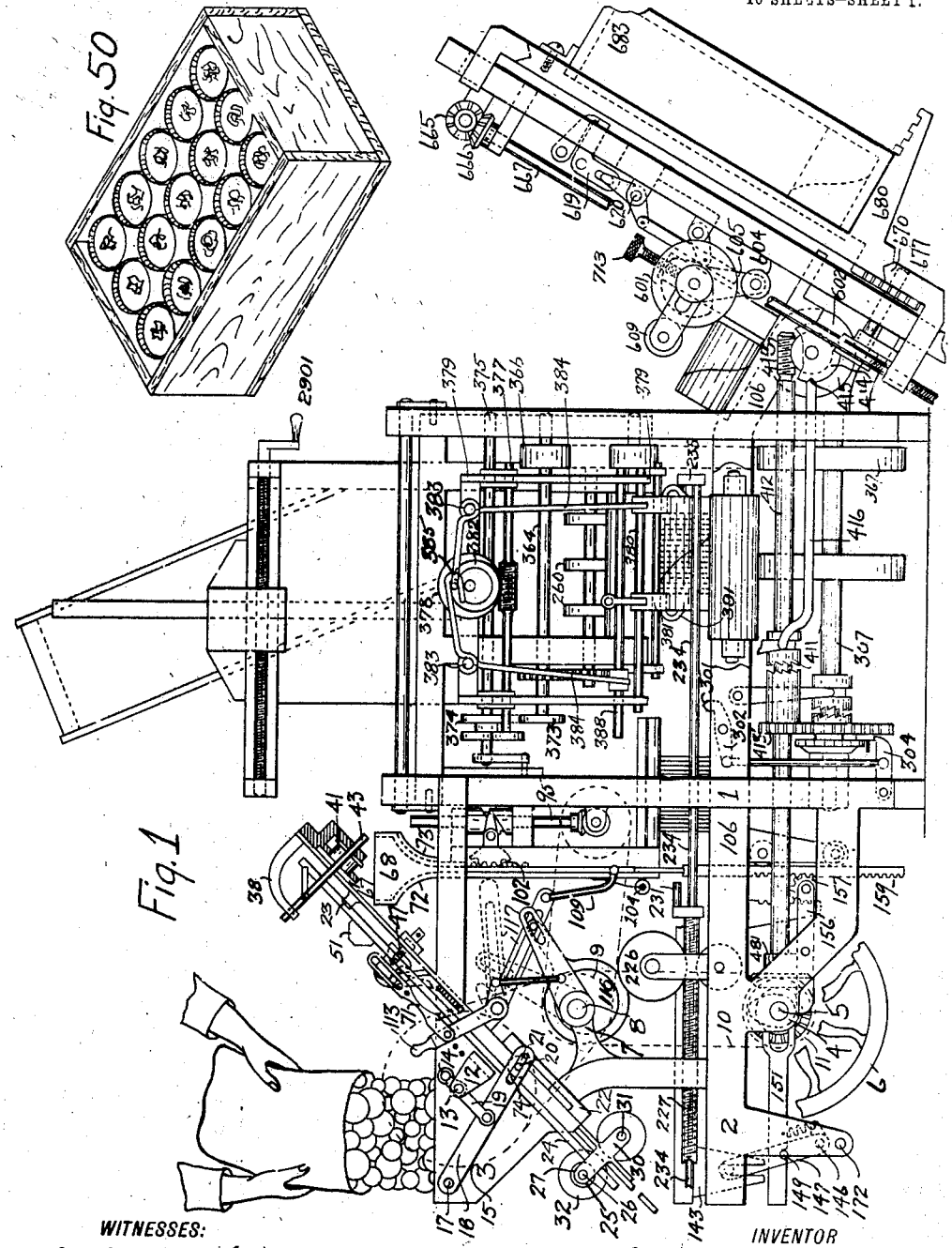

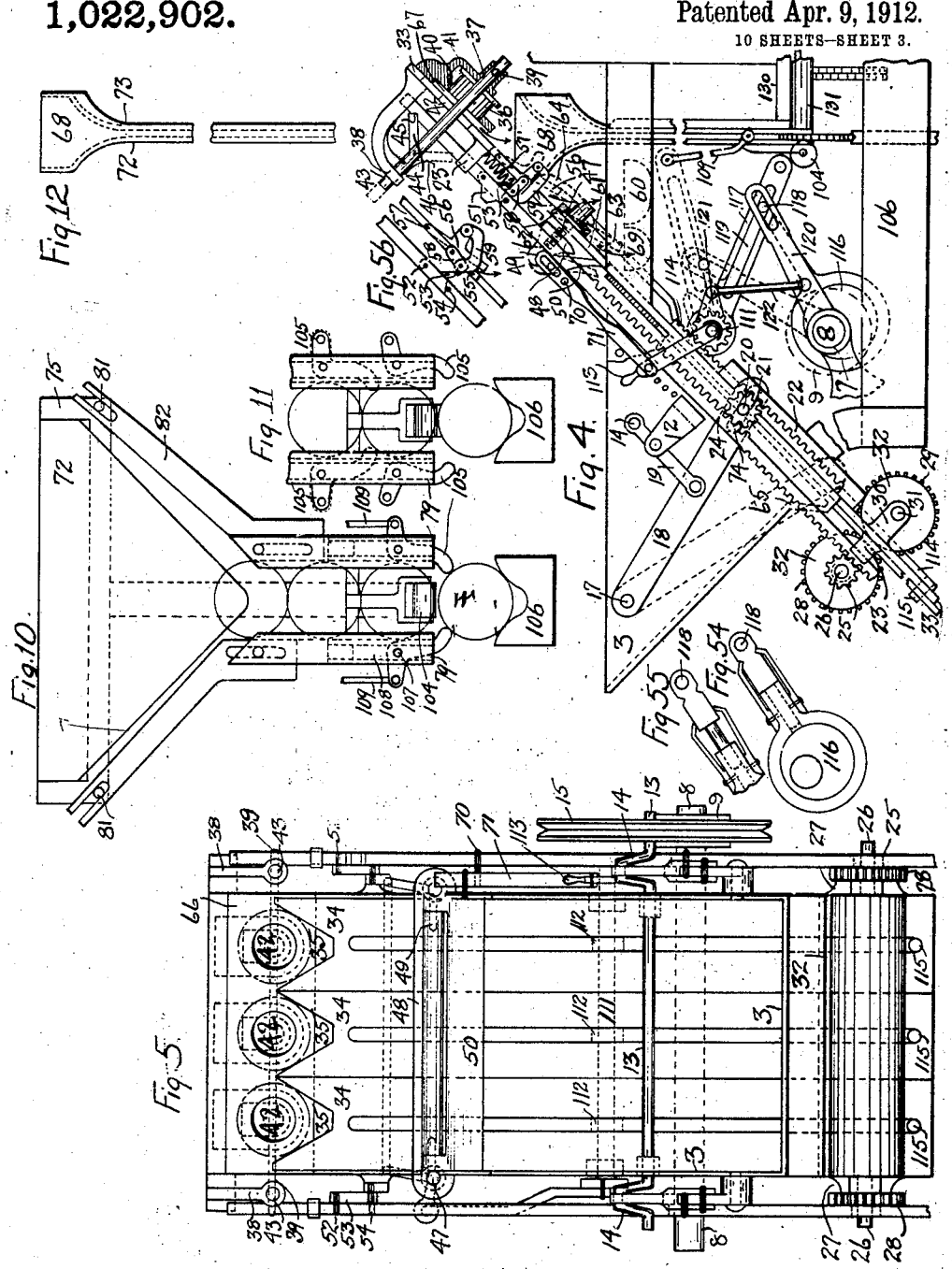

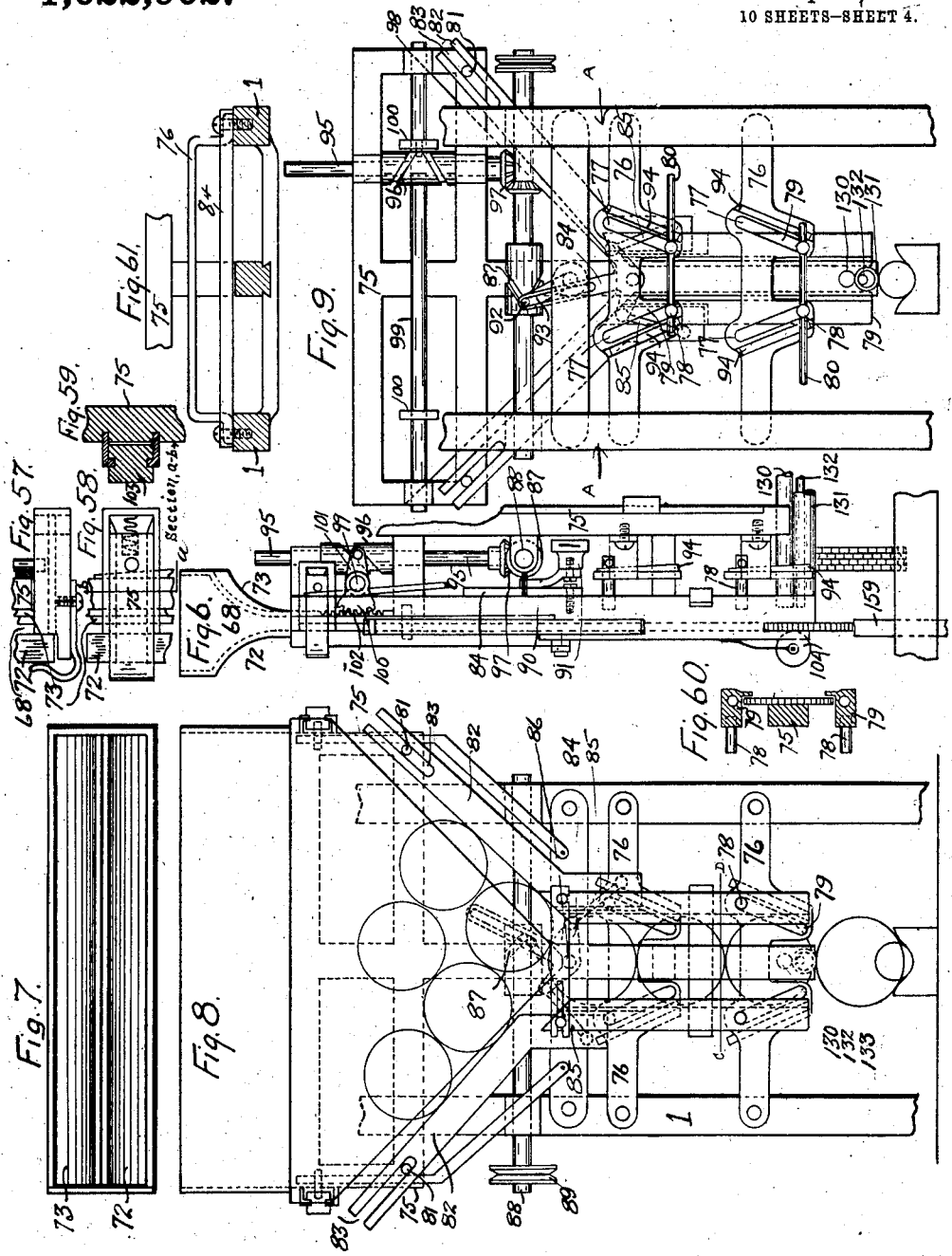

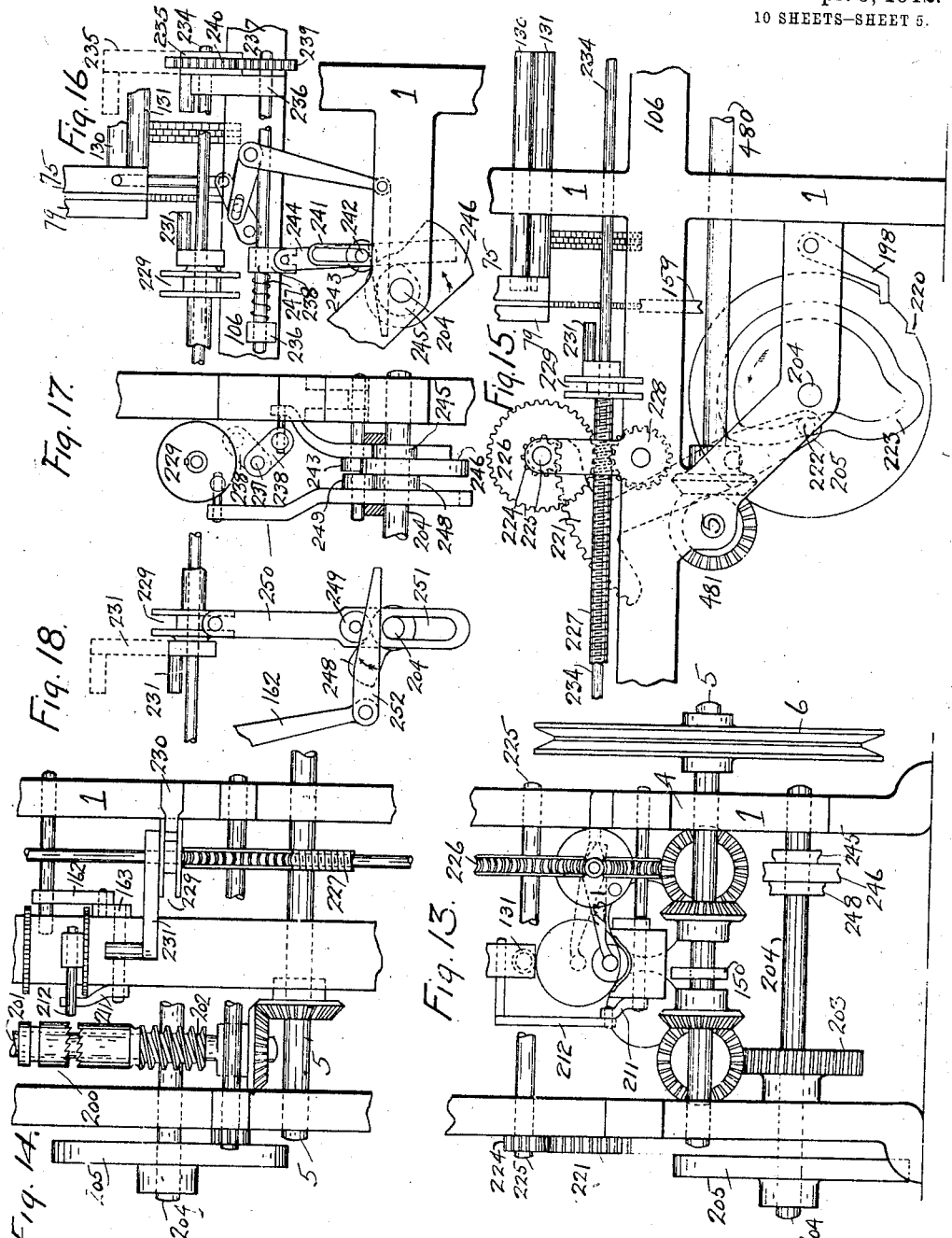

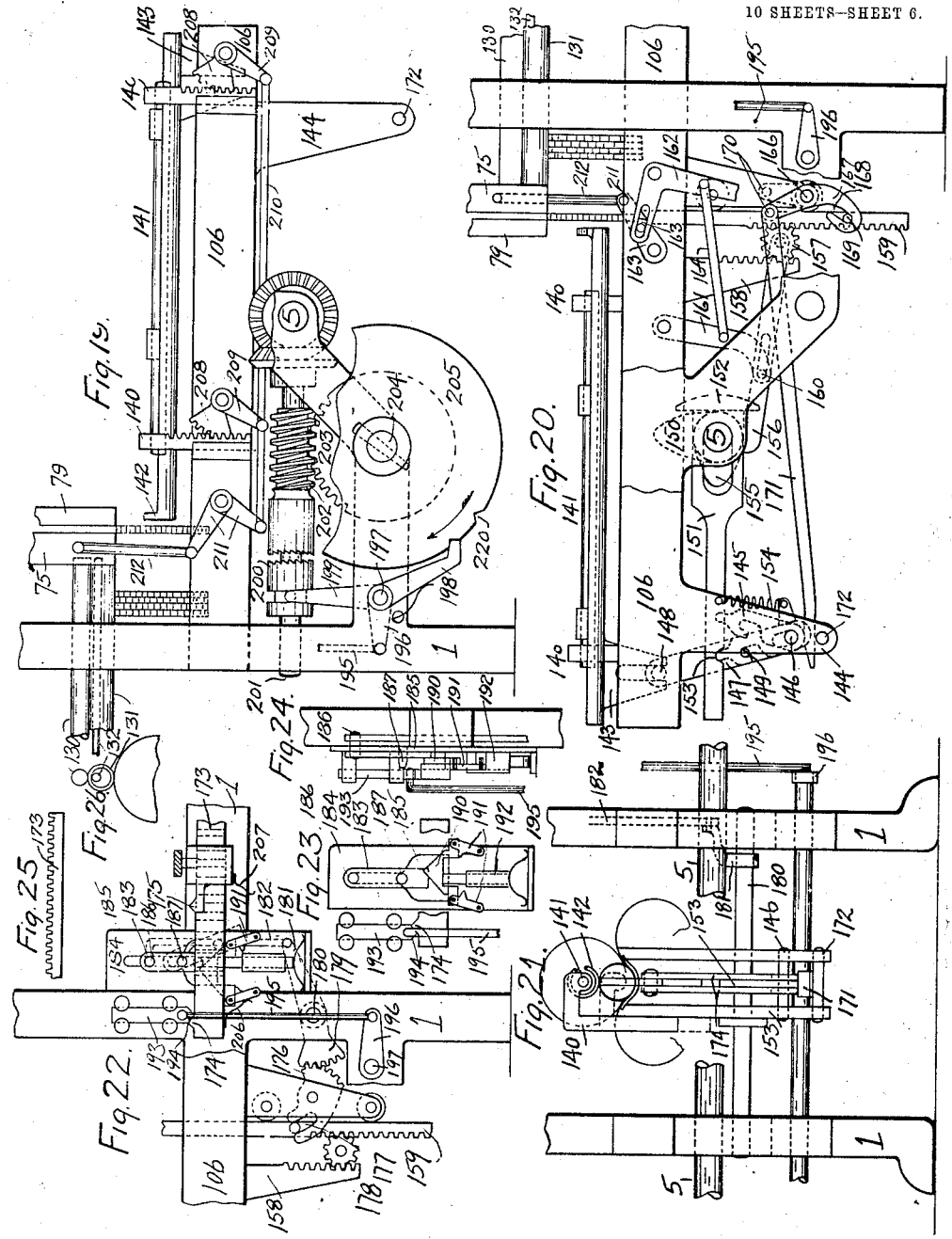

R. B. WARE.
MACHINE FOR HANDLING COINS.
APPLICATION FILED JAN. 6, 1909. RENEWED SEPT. 13, 1911.
1,022,902.
Patented Apr. 9, 1912.
10 SHEETS—SHEET 7.
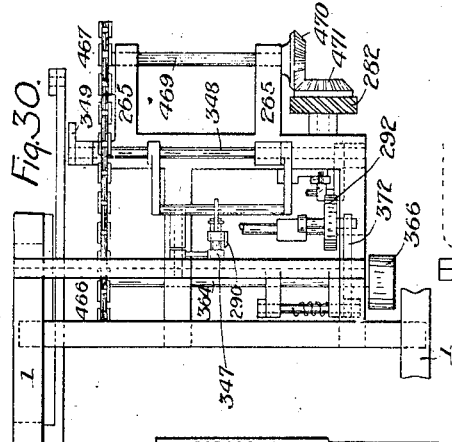
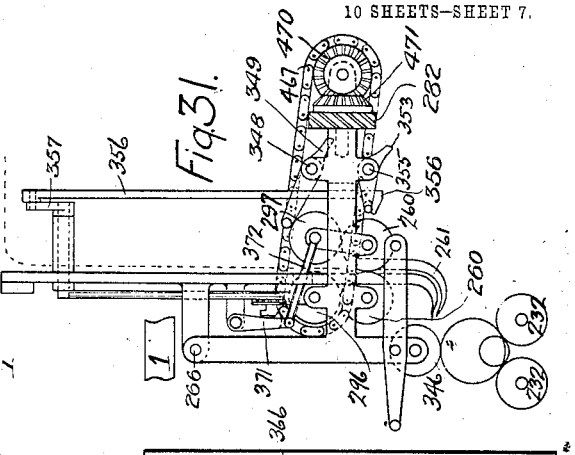
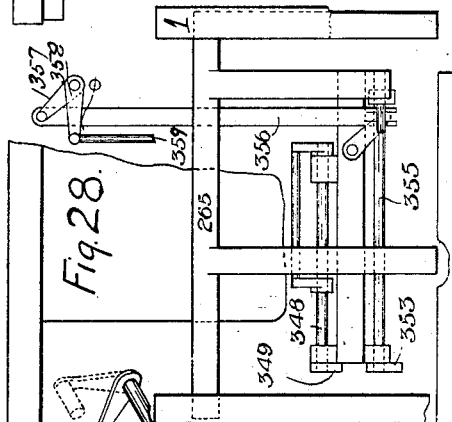
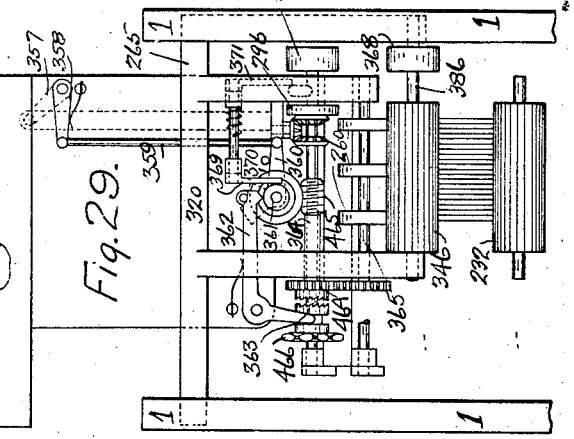
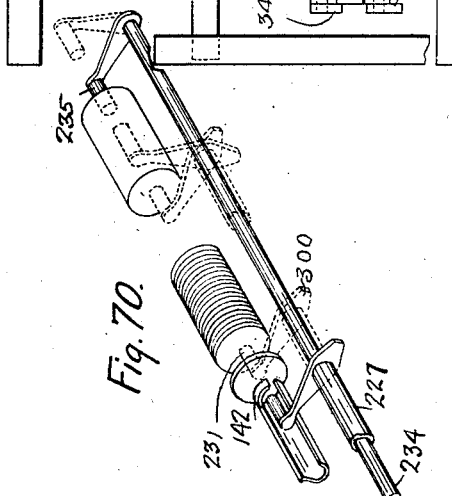
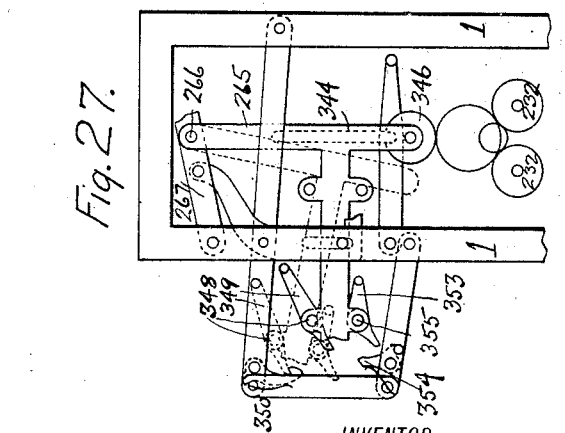
WITNESSES:
Ellen L. Ware
Marguerite Ross
INVENTOR
Rodney Bradford Ware
BY
Edw. Vanterinkle
ATTORNEY

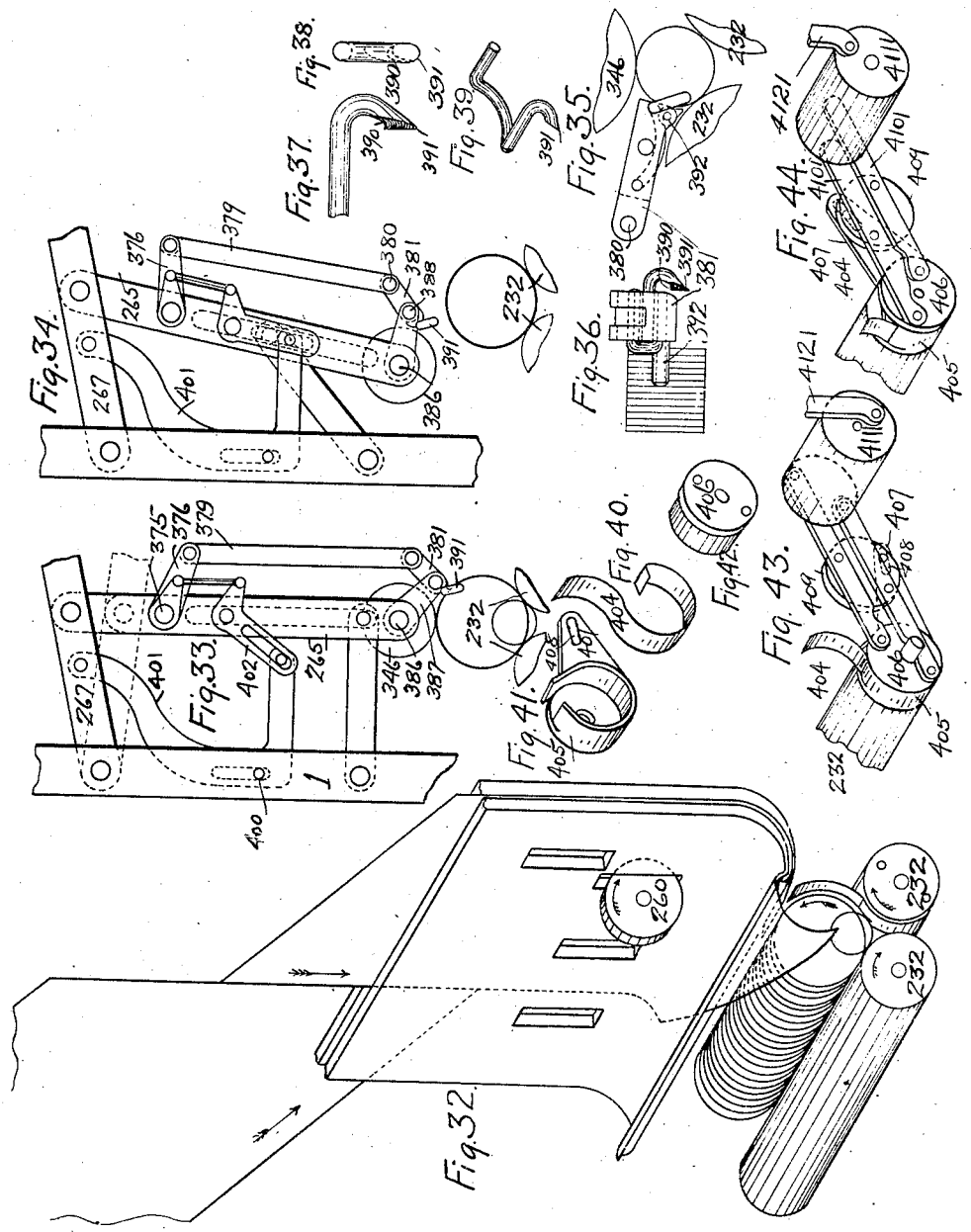

R. B. WARE.
MACHINE FOR HANDLING COINS.
APPLICATION FILED JAN. 6, 1909. RENEWED SEPT. 13, 1911.
1,022,902.
Patented Apr. 9, 1912.
10 SHEETS—SHEET 9.
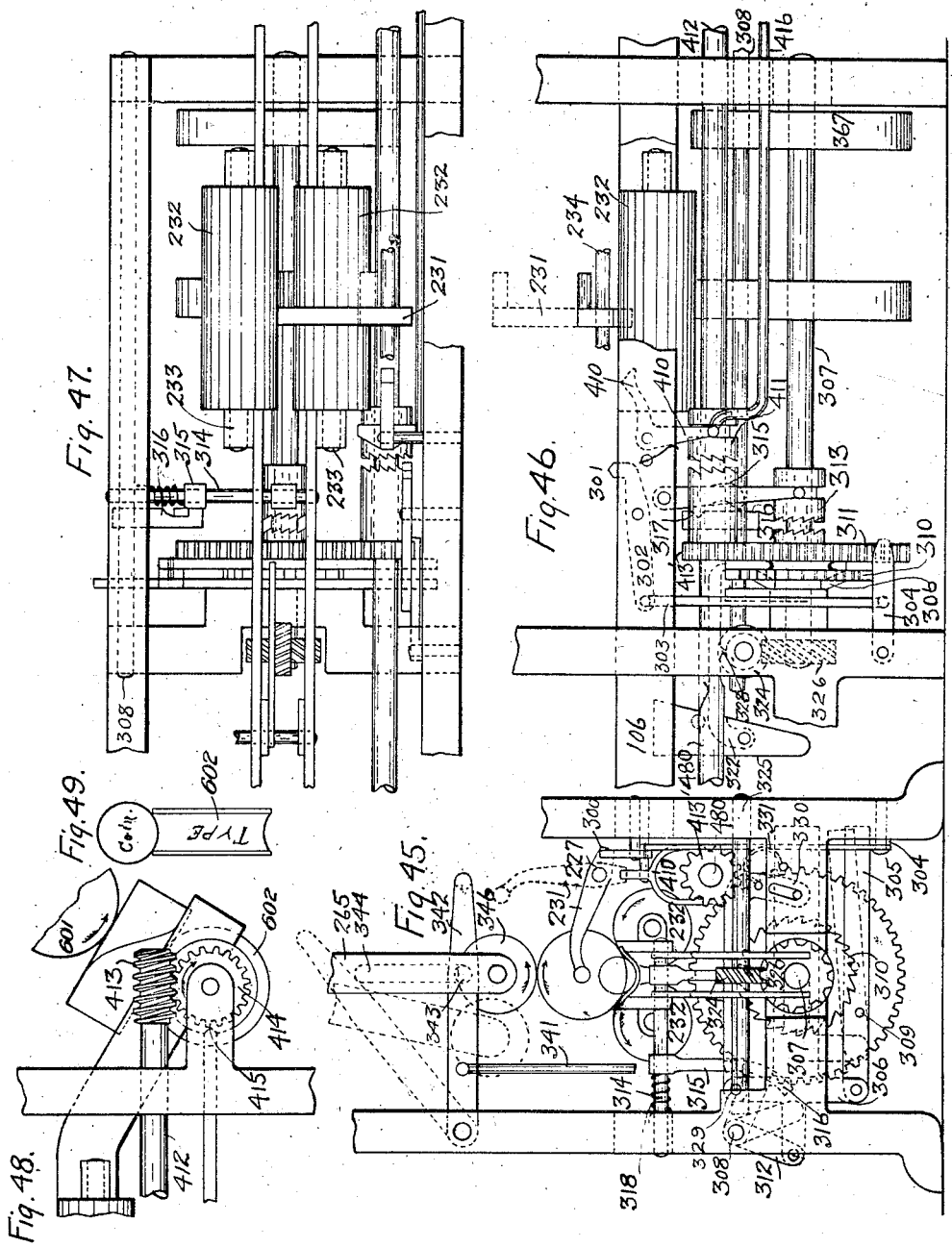
WITNESSES:
Ellen L. Ware
Marguerite Ross
INVENTOR
Rodney Bradford Ware
BY
Edw Vanderinkle
ATTORNEY R. B. WARE.
MACHINE FOR HANDLING COINS.
APPLICATION FILED JAN. 6, 1909. RENEWED SEPT. 13, 1911.
1,022,902.
Patented Apr. 9, 1912.
10 SHEETS—SHEET 10.
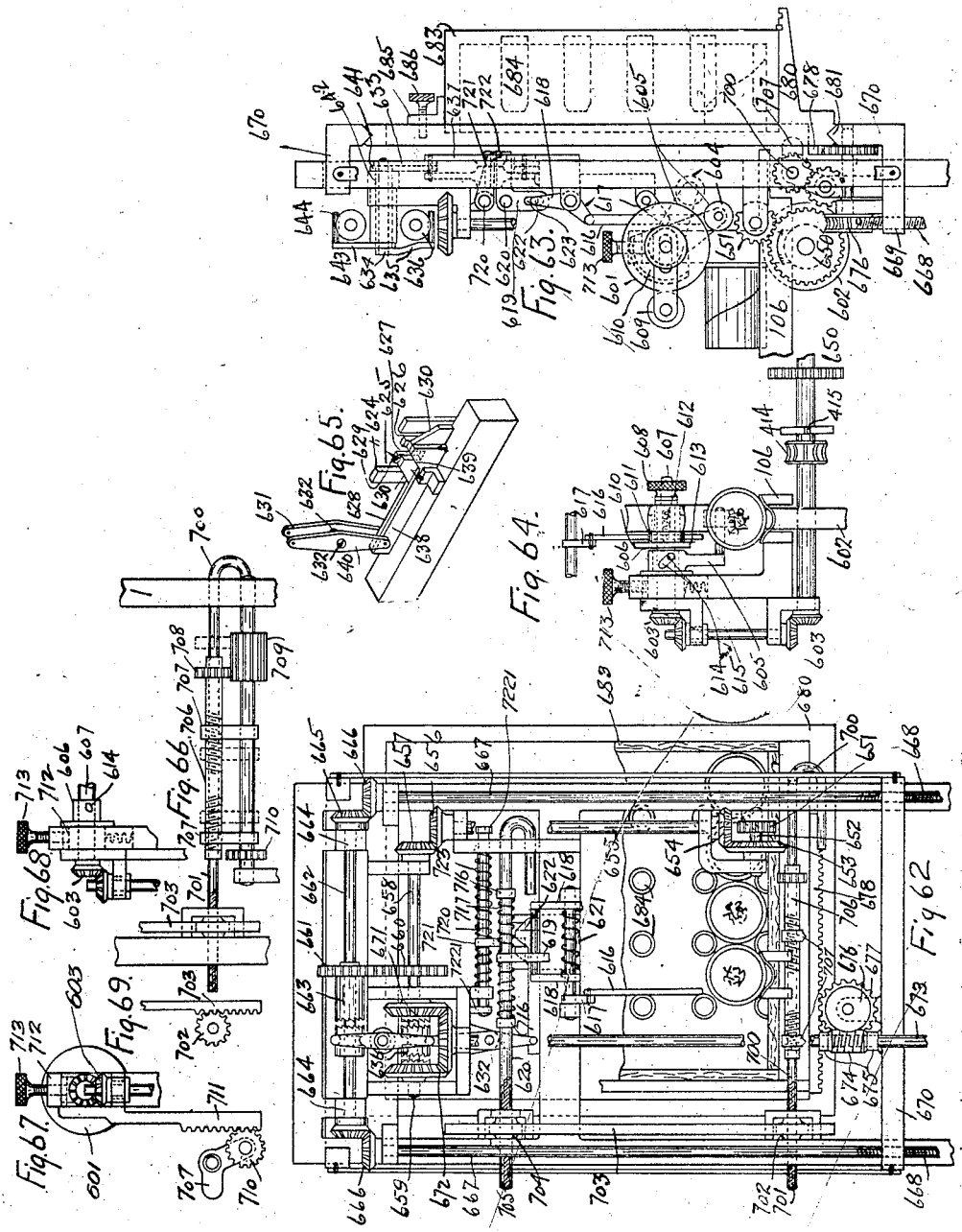

UNITED STATES PATENT OFFICE.

RODNEY BRADFORD WARE, OF THOMPSONVILLE, CONNECTICUT.

MACHINE FOR HANDLING COINS.

1,022,902.        Specification of Letters Patent.        Patented Apr. 9, 1912.

Application filed January 6, 1909, Serial No. 470,998. Renewed September 13, 1911. Serial No. 649,195.

*To all whom it may concern:*

Be it known that I, RODNEY BRADFORD WARE, a citizen of the United States, residing in Thompsonville, town of Enfield, county of Hartford, State of Connecticut, have invented a certain new and useful Machine for Handling Coins, of which the following is a full, clear, and exact description.

The invention relates to a certain new and useful machine in which coins of promiscuous sizes and denominations are separated, according to similar kinds, and divided into stacks containing any desired number, the stacks of coin are wrapped into a roll, the wrapped rolls printed, and packed in a box or receptacle provided for the purpose.

The particular object of my invention is to provide a simple machine for accomplishing the above purpose and to further provide a machine that will eliminate the necessity of changing the rolls of paper every time coins of a different denomination are segregated from the lot of mixed coins, or a different number of coins of the same denomination are being handled.

The invention accordingly consists in the features of construction, combination of elements, and arrangement of parts, which will be exemplified in the mechanism hereinafter described and the scope of the application of which will be indicated in the claims.

The foregoing and other features of my invention will now be described in connection with the accompanying ten sheets of drawings, forming part of this specification, in which I have represented my machine for handling coins in the preferred form, after which I shall point out more particularly in the claims those features which I believe to be new and of my own invention.

Referring to the accompanying drawings in which similar characters of reference indicate like parts throughout the several views, Figure 1 is a front side elevation of my machine. Fig. 2 is an end elevation showing the end of the machine from which the package is delivered with the box mechanism removed. Fig. 3 is an elevation of the machine opposite to Fig. 1, with separating devices removed. Fig. 4 is a side elevation of the separating and feeding devices. Fig. 5 is a plan of the separating devices. Fig. 6 is an enlarged end elevation of the feeding devices, showing the method of reciprocating the sides of the hopper, with the main frame 1 left off. Fig. 7 is a plan of top of hopper. Fig. 8 is a front elevation of hopper and coin guide-way. Fig. 9 is rear of said hopper and guide-way. Figs. 10, 11 and 12 are details of the coin feed. Figs. 13–26, inclusive, show the mechanism to assemble the coins and to divide them into stacks containing a desired number. Figs. 27–31, inclusive, show details of wrapper-handling mechanism. Fig. 32 shows the method of curling the wrapper so that it will coil itself around the coins as it is forced through the curler. Figs. 33–36, inclusive, show details of my crimping mechanism. Figs. 37, 38 and 39 show details of my crimper hook. Fig. 40 shows detail of a flexible tape guide employed to assist the guiding the wrapper around the bundle of coins. Figs. 41 and 42 show details of the housing provided therefor. Figs. 43 and 44 show mechanism employed for adjusting this flexible tape showing the guide in its extreme positions. Figs. 45–47, inclusive, show details of the adjustable driving roll, means provided for its adjustment and method of driving all the rolls. Figs. 48 and 49 show details employed for printing the face value of the coin or other matter on the package and the discharge mechanism. Fig. 50 shows the finished product packed in the receptacle provided for same. Fig. 51 shows the relative position of roll of flexible material and knife, also the mechanism employed for drawing the strip of flexible material in front of the knife which is a top view of paper carrier shown in Fig. 3. Figs. 52 and 53 show enlarged details of this wrapper feed mechanism. Figs. 54 and 55 show details employed in feeding mechanism provided, as a means of release, in case of a jam in the coin guideway. Fig. 56 is a detail of the coin release mechanism in open position. Figs. 57–60, inclusive, show details of the mechanism in the assembly view (Fig. 4). Fig. 61 is a section of Fig. 9 along the line A A and shows the method employed for the vertical adjustment of the coin slot. Fig. 62 is a plan of the box-handling mechanism which is attached to the machine as shown in Fig. 1 at an angle of sixty degrees to the horizontal. Fig. 63 is a side view thereof. Fig. 64 is elevation of the printing rolls which are not shown in Fig. 62. Fig. 65 is a perspective view of the clutch-operating lever. Figs. 66–69, are details which I employ.

Fig. 70 is a perspective of the transfer device.

The separator is adjustably regulated to segregate articles of a similar kind from mixed articles and deliver them to a hopper which is mechanically agitated to prevent the articles from jamming or clogging. The coins are then delivered by gravity to a set of gripping dogs which forcibly advance the coins vertically to the extreme lower position and stack them in rows by the side of those previously assembled. The roll of articles is then divided into stacks or bunches containing any desired number and each bunch is moved laterally, wrapped and delivered packed in a receptacle provided for the purpose.

In order to facilitate the description of my invention, I will divide this specification into six parts: 1. Separating devices. 2. Delivering devices. 3. Stacking devices. 4. Paper-handling devices. 5. Wrapping mechanism. 6. Printing and boxing mechanism. I will then show how all these various parts coöperate to make a complete whole.

For a clear understanding of my invention, it must be remembered that the same mechanism is employed for handling coins of small denominations as is employed for handling coins of a large denomination, and the same separating devices are used, the parts being adjustable to receive coins of any diameter and thickness.

As will be readily understood, my invention, although especially adapted to count, wrap, and handle coins of various denominations, may be employed for counting checks or disks or anything that is round and uniformly thick.

*Separating devices.*—For convenience I employ main frames 1, provided with supporting arm 2, on which is mounted a receptacle 3 of the separating devices, which is shown in the illustration, hopper-shaped with flat sides. Mounted in suitable bearings 4, in the arms 2, is the main driving shaft 5 provided on one end with a driving wheel 6 to which is attached the power. Suitably mounted in bearing 7 in the receptacle frame 3 is the shaft 8, which is driven by any well-known method of transmission from the main driving shaft 5. For the purpose of convenience in this application it is shown belted to the main shaft 5 through the pulley 9, belt 10 and pulley 11 which is mounted on main driving shaft 5. In bearings 12, which are provided on the sides of the receptacle frame 3, is mounted the crank shaft 13 provided with two cranks 14. On the extreme end of this crank shaft 13 is a pulley 15 which is belted to a pulley 9 on shaft 8. Pivotally mounted to the side of the hopper at 17 is the arm 18 which is connected through a link 19 to the crank 14 and is rocked thereby. On the extreme outer end of the arm 18 is a slot 74 in which is mounted on a stud 20, gear 21. The stud 20 is adapted to move radially in the slot 74 and is provided solely for the purpose of carrying the gear 21. On each side of the hopper frame 3 are rigidly mounted racks 22. In bearings 23, slidably mounted, is a toothed bar 24, provided with teeth which mesh with the upper portion of the gear 21. The lower portion of the gear 21 meshes with the rack 22. As will be readily understood, this will give twice the reciprocating motion to the toothed bar 24 that is given to the gear 21. The toothed bar 24 on its lower end is provided with teeth which engage a gear 25 mounted on a shaft 26 in bearings 27. On the shaft 26 are gears 28 which mesh with gears 29 mounted on shaft 31 in bearing 30. On shafts 26 and 31 are two friction rollers 32. On the right-hand bottom of hopper 3 is a fixed plate 33 on which are slidably mounted flat pieces 34 notched at one end as at 35. These plates 34 pass between the friction rollers 32 and are reciprocated by the revolving of these rollers. In my drawings I show three of these plates 34; a greater or lesser number may be employed as may be convenient or desirable. A larger quantity of mixed articles would require a greater number of these reciprocating plates.

On either side of the upper end of plate 33 in bearings 37 and 38 are two pins 43 slidably mounted, connected by rod 39. Mounted on 39 are plungers 36 adapted to slide in bearings 40 and provided with a shoulder 41 to limit the stroke of the plunger. These plungers are so spaced that they are coaxial with holes 42 in plate 33. On the pin 43 is pivotally mounted a spring pawl 44 adapted to ride on the reciprocating toothed bar 24 and be engaged by notch 45. As will be readily understood by referring particularly to Fig. 4, it will be seen that on the downward stroke of the toothed bar 24 the pawl 44 is engaged by notch 45, the plungers 43 will be raised thereby, allowing the pawl 44 to swing past the center and as soon as the end of the toothed bar 24 frees the pawl 44, it will swing in the plane of the axes of the pins 43 and be held there by spring 46. The object of these plungers is to remove any mutilated coin that has failed to pass through the hole 42 and has, for any reason, lodged therein. After coins have been in circulation for any great period they become more or less mutilated and for the purpose of removing bent and flattened coins, I provide gages to measure both the diameter and thickness of each piece handled and means for removing the articles that are not within the limits of the machine as adjusted. On the plate 33, by means of the vertical screw studs 47, is mounted a gage 48 which gages the thickness of the coin. This gage 48 may be raised and lowered by means of the vertical screw studs 47, details of which will be explained later. Mounted on pivot bearings 49 is an apron 50 which bears against plate 33 and turns all of the coins except those in proper position in the notch 35 on the end of reciprocating plates 34 back into the hopper 3. Mounted on reciprocating toothed bar 24 is a tooth 51 which is provided to raise the apron 50 at suitable time to allow the coin in the proper place in the notch 35 to pass under the apron, as will be seen in the dotted position in Fig. 4. Pivotally mounted at 52 on the reciprocating toothed bar 24 is a pawl 53 held by gravity against the pin 54. In plate 33 is an opening 55 which is closed by a plate 56 hinged at 57. This plate 56 is held in its closed position by spring 57' and links 58 and 59. The pawl 53 is adapted to engage a portion of the link 59 thereby swinging the plate 56 downward, allowing any coins which do not pass through the hole 42 to be deposited in receptacle 60 provided for the purpose. In plate 33 is an opening 61 directly under the gage 48. Pivotally mounted at 62 is a plate 63 adapted to close the opening 61. Bearing against the plate 63 is an arm 64 which is fastened to plate 56. As will be readily understood, this connection allows both the plates 63 and 56 to swing in unison when the link 59 is tripped by the pawl 53. On the lower end of hopper 3, I provide a bend 65, the object of which is to insure all of the coins falling flat on the plate 33. The holes 42 are in a removable plate 66 and are sized to correspond with the diameter of the article to be segregated from the mixed articles. Directly under the hole 42 is a plane surface 67 on which the articles of proper size drop, after passing through the hole 42 from which they slide by gravity into coin guide-way 68.

With the above detailed description it will be readily seen that articles of mixed sizes can be placed in the hopper 3 and they will fall by gravity in front of the reciprocating plates 34 and thereby be advanced under the gage 48 which permits only articles of certain thickness to pass. All articles of excessive thickness are held under this gage, the desired sizes passing under are further advanced until they arrive directly over the hole 42. If the diameter of the article is the proper size it will pass through the hole 42 and slide into the guide-way 68. If it is too large it will not pass through the hole 42 as will be readily understood. Articles whose diameter is smaller than the size desired will remain in the notch 35 and will not be advanced sufficiently far to tumble into the hole 42. On the return stroke of the plates 34 the hinged plates 63 and 56 are allowed to drop and release both the coins of too large a diameter and too small a diameter and to deposit them in receptacle 60 and also release the coins of too great a thickness and bent coins and deposit them in receptacle 69. On the next return stroke more coins are lodged in the notches 35 and are advanced in the same way. In case a coin is ahead of the proper position in notch 35 it will be turned back into the hopper by the apron 50. This apron 50 in the same manner would turn all of the coins back into the hopper unless it were raised at the proper time through the tooth 51, striking against the pin 70 on the adjusting link 71.

*Delivering devices.*—We have now traced the passage of the article from the hopper 3 to the guide-way 68. The guide-way 68 comprises two vertical strips 72 and 73 converging at the top, as shown in Fig. 12. The front plate 72 is preferably made of glass and is adjustably secured to the frame 75 of the guide-way, details of which are clearly shown in Figs. 57, 58 and 59. Rigidly secured to the main frame 1 are two slotted bars 76 provided with slots 77 which are provided for directing the movement of the pins 78 in the adjustable guide-way 79. To keep these guide-ways in line, I provide guiding rods 80 which are fastened to one of the pins 78 and slide through the hole in the opposite pin. In the frame 75 I provide two pins 81 as bearings for the upper end of the agitator arms 82. These agitator arms are provided with slots 83 in the upper ends and adapted to engage the pins 81. The lower end of these agitator arms are connected by a T-lever 84 through links 85. The T-lever is pivoted to the frame 75 at 86. This lever is rocked by the cam 87 on the shaft 88 which is connected by any well-known means of transmission to the main shaft 5 through the pulley 89. The shaft 88 is mounted in suitable bearings provided on frame 1. In order to vary the amount of movement of these agitators, I provide a lever 90 pivotally mounted to the main frame 1 at 91. At the upper end of this lever I provide a roller adapted to engage the cam face 87 and a pin 92 adapted to engage the slot 93 of the T-lever 84. It will be readily seen that with this construction the fulcrum of the T-lever 84 will be varied according to the vertical position of the frame 75 with respect to the main frame 1. The frame 75 is slidably mounted to main frame 1 by the dove-tail shown in Fig. 61. In order to provide adjustment of the guide-way for the thickness of the article I provide wedges 94 mounted on the slotted bars 76 and bearing against the horizontal guide rod 80 which guide the rods, forcing the pin 78 through their bearings which increases or decreases the opening of the guide-way. Mounted on frame 75 in suitable bearings is a vertical shaft 95 provided with a cam 96. This shaft 95 is driven through gears 97 from shaft 88. Also on frame 75 in bearings 98 is mounted a horizontal shaft 99 which carries segmental gears 100. One of these segmental gears is provided with a crank 101 adapted to engage the cam 96. The segmental gears 100 mesh with racks 102 on the side of the guide-way 68. As will be readily understood, when shaft 95 revolves the side 73 as well as the bottom 82 of the guide-way is reciprocated vertically.

Referring to Figs. 10 and 11, it will be seen that the coins are fed vertically and with this method gravity delivers the coins to a position in the guide-way and they are retained there, by a spring-pressed roller 104 and are held until the dogs 105 take hold of the coin and force it through to its extreme lowest position in the trough 106. The dogs 105 are pivotally mounted at 107 to a slidably mounted rod 108 in guide-ways 79 and are reciprocated by means of links 109 and 117. Fig. 11 shows the extreme position of the dogs 105, the lower dogs show the position after they have released the coin. In suitable bearings in the hopper 3 is mounted a shaft 111 provided with a series of gears 112, one for each notched plate 34. Attached to the shaft 111 is lever 113 used for the purpose of adjusting the mechanism for the different diameters and thickness of the articles to be handled. Under plate 33 are toothed bars 114 slidably mounted, the rack meshing with gears on shaft 111. The lever 113 is connected to apron 50 through link 71 which carries a pin 70. This pin is in the path of toe piece 51 of the reciprocating tooth bar or rack 24. The relative position of this pin varies the time of raising of the apron 50 as will be readily understood. This lever 113 is also fastened on rock shaft 111 which carries gears 112. The gears 112 mesh with the teeth of rack bars 114. As these gears 112 revolve, the position of the stroke of the notch bars 34 is determined. The stroke varies as has been previously described. The movement of this arm 113 also regulates the stroke of the coin feeding lever or link 117. On the lower end a pin 115 is provided, which regulates the position of the stroke of notched plate 34. On shaft 8 is mounted an eccentric 116 which is connected to links 117 through the stud 118 which is adapted to slide in the slot 119. Also mounted on shaft 8 is a slotted arm 120 which is connected to link 117 by the same stud 118. Mounted on shaft 111 is an arm 121 connected by link 122 to arm 120. It will be readily seen, therefore, by adjusting the position of the lever 113 that the amount of the stroke and the position of the dogs 105 are accordingly regulated to handle articles of greater or less diameter. In Fig. 4 the full line and dotted position of this chain of mechanism shows the extreme positions. As a matter of precaution the arm attached to the eccentric eye is made as shown in Figs. 54 and 55 so that a release may be made upon the clogging of the coins in the guide-way without any damage to the mechanism. It will also be noticed that the lever 113 is connected to the apron 50 through the link 71, which also regulates the time of raising of the said apron when the tooth 51 comes in contact with pin 70.

*Stacking devices.*—As before described, the coins are fed down between the sides of the guide-ways 75 into the trough 106. Each coin is then moved horizontally a distance little more than its thickness so as not to interfere with the next succeeding coin. To hold these coins in a row I provide a rod 130 which is fastened on one end to 75, extending parallel to the trough 106. A piece of flexible tubing 131, preferably rubber, is held against the rod 130 by a rod 132 running through the tube. The rod 132 is also fastened to the frame 75. Details of this construction may be readily seen by referring to Fig. 26. The frame 75 is adjusted vertically so that the diameter of the tangent circle touching the side of the trough 106 and the rubber tube 131 is the same as the diameter of the article segregated from the mass of mixed articles. This 3-point contact supports the articles vertically on their edges and the flexibility of the upper contact holds them together.

In suitable hangers 140 is mounted a rod 141 on which tube 142 is adapted to slide. On one end of tube 142 is a depending yoke 143. The top half of the tube 142 is cut away, as will be readily seen in Figs. 19, 20 and 70. In the outer end of trough 106 is a depending lug 144. Pivotally mounted to 144 is an oscillating hook 145 on the stud 146. This stud is also adapted to engage a slot in a link 147. The link 147 at its upper extremity is provided with a pin 148 adapted to engage the slot in the yoke 143. This link is also provided with a pin 149, the purpose of which will be described later. Mounted on main driving shaft 5 is a cam 150. Straddling the shaft 5 is a link 151 provided on its outer face with a surface 152 against which cam 150 rides. This link is provided with a notch 153 which is adapted to engage the point of the oscillating hook 145 and is held in engagement by a spring 154 which also tends to hold the cam 150 against its working face 152. Also mounted on main driving shaft 5 is a cam 155 adapted to ride against a lever 156. This lever is provided at the extreme end with a gear 157 adapted to roll in a rack 158 depending from the trough 106. Directly under the coin delivery is a vertically movable toothed bar 159, slidably mounted, the teeth of which mesh with the teeth of the gear 157. Every time a coin or article is delivered to trough 106, this vertically movable toothed bar 159 is forced to its lowest position and after the coin or article has been moved horizontally the cam 155, through the lever 156, throws the toothed bar 159 to its highest position. In order to provide adjustment of the stroke of this vertically movable toothed bar 159 I provide movable fulcrum 160, levers 161, 162, 163, and links 164 and 212. The link 212 is connected to the frame 75 so that the adjustment of the arm shifts the position of the movable fulcrum 160. The operation of this mechanism will be readily understood by referring to Fig. 20. Pivotally mounted at 166 is a lever 167 provided with a cam hook 168 adapted to engage a pin 169 mounted on the toothed bar 159. At the other end of lever 167 pivotally mounted at 170 is a wedge bar 171 adapted to ride on pin 172 and thereby raise link 147 so that pin 149 engages the hook 145 which is reciprocated, receiving its motion direct from main shaft 5. This reciprocates link 147 and tube 142 which horizontally transfers the article or coin, eliminating any possibility of the coin from interfering with the next succeeding coin. On the return stroke of the toothed bar 159 wedge bar 171 is withdrawn which disconnects pin 149 from its hook 145, releasing the power, which is only connected in case another coin is brought into contact with 159 by the dogs 105.

In Fig. 25 I show a plan of my recording bar, consisting of a rack 173 used for regulating the number of articles to be stacked or bunched. This rack or recording bar 173 is slidably mounted in suitable bearings on the main frame 1. On extreme left-hand end of this recording bar 173 is provided a stationary toe-piece 174 and an adjustable toe-piece 175 which may be adjusted any desired distance from the stationary toe-piece 174. The distance between these toe-pieces regulates the number of articles to be assembled in a bunch. Mounted on a depending lug from trough 106 is a segmental gear 176 provided with a cam slot 177 adapted to engage a pin 178 mounted on toothed bar 159. This rack is moved every time a coin is fed into trough 106, as will be readily understood. The segmental gear 176 meshes with the segmental gear 179 which is pivoted to the main frame 1 at 180 and rocks lever 181. On the extreme end of 181 is link 182 which is adapted on its upper end to move a member 183 vertically. In an extension 184 of the main frame 1 is a slot 185, the sides of which for a short distance from the top extend parallel diverging at the bottom into a wide opening, which will be readily understood by referring to Fig. 23. Adapted to slide in this slot is the member 183 provided with two pins 186 and 187, 187 being free to move in the opening at the lower end of 185. When member 183 is forced down through the motion of the toothed bar 159 through its connected links, the pin 187 rides against the sides of the triangular piece 190 which is mounted through links 191 to the extension 184 of the main frame 1. This triangular piece is adapted to move across the path of pin 187 which directs the movement of the member 183 to the right or to the left and acts as a cam face for the pin 187 to ride upon. As the member 183 is moved downward, due to the advancing of an article to the trough 106, pin 187 engages a notch in the recording bar 173 and then rides upon one of the faces of the triangular piece 190 which directs the recording bar 173 to the right or to the left, according to the position of the triangle piece 190. The motion of the bar 173 is locked by spring-pressed pawl 192 which is brought out of engagement with the recording bar 173 by the lower end of the member 183. Mounted in suitable bearings is a member 193 adapted to move in a vertical direction and provided with a face 194 in the path of the toe piece 174. This member 193 is connected through link 195 to lever 196 pivoted to the main frame 1 on a rocker shaft 197. Also secured to this rocker shaft is a dog 198 and a lever 199. The lever 199 is provided with a fork adapted to throw in clutch 200 which is slidably mounted on a spindle 201 geared to main shaft 5. Mounted free on spindle 201 is a worm 202 adapted to mesh with worm gear 203 on shaft 204 mounted in frame 1.

In Fig. 22 the relative position of all the parts shows the machine ready to receive the last coin in the stack and the bar 173 is going toward the right. Upon the advancing of the last article the member 193 is raised on account of face 194 riding upon the toe-piece 174 which withdraws the pawl 198 from its notch on cam 205 mounted on shaft 204: also brings into engagement the clutch 200 with the worm 202 and revolves the cam 205, which will be readily understood by referring to Fig. 19. The pawl 198 is pressed against the cam 205 by its spring and as soon as it comes into engagement with the notch 220 it releases the clutch 200 and the shaft 204 ceases to revolve. Pressing against the links 191 is the spring 206 which is attached to bar 173 and throws the triangular piece 190 to its extreme right-hand position, shown in Fig. 23, which reverses the horizontal motion of the recording bar 173. A similar spring 207 is attached to the adjustable toe-piece 175 which will throw the triangular piece in its extreme left-hand position upon the return stroke of the recording bar 173.

As will be readily understood by referring to Fig. 19, as the diameter of the article to be handled is greater or less, the center of the article as stacked between the points of contact of the trough 106 and the member 131 varies, and to insure tube 142 striking the center of the article, the hangers 140 are mounted on racks with adjusting segments 208 which are pivoted to the trough 106. The means of adjusting the vertical height of the center line of this tube can be readily seen. As these segmental gears 208 are connected to the guide-way frame 75 through the levers 209, links 210, 212 and the crank 211 which is pivoted to trough 106.

Referring to Fig. 19 the pawl 198 is shown in engagement with the notch on cam 205. As described previously the last coin of the bundle withdrew this spring-pressed pawl from its notch and threw the clutch 200 in engagement with worm, revolving cam 205 through the gear 203 until the pawl 198 engages the notch 220. Following the same movement, the next succeeding coin being delivered in the trough 106, the pawl 198 is withdrawn from 220 and the shaft 204 completes its revolution to the original position as shown in Fig. 19. Pivotally mounted to frame 1 is the segmental gear 221. On the opposite end of this segmental gear is a stud 222 adapted to engage the cam slot 223 on the inside face of cam 205. The segmental gear 221 meshes with the teeth in the pinion 224, mounted on shaft 225 in suitable bearings in frame 1. On shaft 225 is a friction driven worm gear 226 adapted to mesh with the threaded tube 227 held in engagement with the teeth of the worm gear by a worm pinion 228. On the right-hand end of the threaded tube 227 is a spool 229 slidably keyed on the tube. This spool is held in position with respect to the main frame 1 by the dog 230. On the extreme end of the tube 227 is an arm 231 adjustable so as to strike the center of the bunch of coins or articles, as will be readily understood by referring to Fig. 13. While the cam 205 revolves during the time the dog 198 is traveling between the first and second notch the forward motion to the right, as shown in dotted position, is given to the threaded tube 227 which divides the stack of coins and also provides a support for the next succeeding coin. As soon as the dog 198 is withdrawn from notch 220 the cam 205 continues to revolve and through the segmental gear 221, pinion 225, worm gear 226, the tube 227 is advanced which pushes the stack of coins out of the trough 106 and on the rollers 232 with fixed bearings 233 and against stop 235 remaining in that position until the package is wrapped and then continuing its stroke, pushes the package farther and down the trough into the printing and boxing mechanism. The tube 227 is then returned to its original position as shown in Fig. 15. Mounted inside of the tube 227 is a rod 234 provided on its extreme end with arm 235 which acts as a stop for the articles to be pushed against. As soon as the articles come in contact with arm 235, the worm gear 226, which is frictionally mounted to shaft 225, slips, as will be readily understood. This allows for the transfer of packages of articles of varying lengths, to the proper position for the crimping device. Mounted in bearings 236 in the main frame 1 (see Fig. 16) is a shaft 237 provided with an arm 238 and a gear 239. The gear 239 meshes with teeth of gear 240 on the shaft 234. The gear 240 has two flanges which project over the teeth and straddle the teeth of gear 239. The tail of the arm 235 is adapted to ride in between the two flanges on either side of gear 240. Mounted on frame 1 is an upright slotted member 241 in which is mounted a stud 242 carrying a roller 243. The stud 242 acts as a fulcrum to lever 244 which is pivoted to arm 238. Its lower end is rocked by cam 245. The object of this mechanism is to swing the arm 235 up out of the way of the package so that the package can be ejected after it is wrapped, and this is done by cam 246. Cam 245 compresses the spring 247 and rocks lever 244 around its fulcrum stud 242. Cam 246 bears against roller 243 and moves lever 244 vertically. This concerted action first moves bar 234 horizontally which moves arm 235 as previously described, so as to clear the end of the package after which it is raised by cam 246. Mounted on shaft 204 adjacent to cam 245 is a cam 246 against which roller 243 travels. A revolution of shaft 204 will raise the fulcrum roller 243, rocking the arm 238 into the dotted position shown in Fig. 17 which rotates the shaft 237 and through gears 239 and 240, shaft 234 is revolved about 90 degrees, which swings the arm 235 out of the path of the coins as shown in Figs. 16 and 70. This chain of mechanism is returned to its normal position by the coiled spring 247. Also mounted on shaft 204 is cam 248 which bears against roller 249 mounted on link 250. Link 250 is provided with a slot 251 which straddles the shaft 204 and is pivotally connected to the spool 229 which rotates the tube 227 and swings the arm 231 into the dotted position, as shown in Figs. 18 and 70, so that it can be returned to its normal position without interfering with the coins being stacked. On the lower end of lever 162 pivotally mounted is a wedge 252 on which roller 249 rests. The position of this wedge regulates the position of the arm 231 so that it strikes the center of the package.

*Paper-handling devices.*—Referring particularly to Fig. 51, 262 is a roll of flexible material, from which the wrapper is cut in varying sizes to fit the package to be wrapped. To support the roll of paper I provide a frame 263 carrying a trough which is pivoted at 264 and allowed to swing, varying the angle of inclination with the vertical. The paper-handling mechanism is carried by swinging frame 265 which carries the stud 264 on which is pivoted the paper trough which is a part of the frame 263. The frame 265 is pivoted at 266 to the segmental gear 267 which is in turn pivoted to the main frame 1 at 268. The segmental gear 267 is in mesh with teeth of pinion 269 which is pivoted to frame 1, as will be readily understood by referring to Fig. 2. Thus by turning the gear 269 by means of the lever 270, the frame can be raised or lowered manually at will. On the upper end of frame 265 (see Fig. 2) is mounted a hand crank shaft 272 and through gears 273 and screw 274 the nut 275 may be raised or lowered, as will be readily understood. When the nut 275 raises the paper trough to the upper position the two screws 278 and the rod 2781 in back of paper trough 263 slide through the paper trough frame in bearings 2782 and 2783. The shaft 281 carrying spur gear 282 swings with paper trough frame 2263 around its fulcrum 264. Nut 275 carries an arm 276 which is pivotally connected to paper trough 263 at 277. This raises and lowers the paper trough as will be readily understood by referring to Fig. 3 in which the full lines show the paper trough in the lowest position, or in position for forming wrapper for a package of five cent silver pieces, and the dotted lines show paper trough in the upper position, or that which forms a wrapper for a package of silver dollars. Mounted in suitable bearings in frame 263 are two screws 278 connected by gears 279 and driven through beveled gears 280, which are mounted on shaft 281 and through spiral and spur gears 282, the shaft 281 is revolved from shaft 264. Mounted on screws 278, which are mounted in bearings 2782 and 2783 on the paper trough, is a traveler 283 carrying a paper-gripping mechanism 284 which will be explained in detail later. Pivotally mounted on the traveler 283 is a lever 285 which carries toothed member 286 adapted to be thrown in engagement first with one screw 278, and then with the other. Pivotally mounted on the traveler is a striking arm 287 which is connected to the nut 286. The striking lever 287, on the upward stroke of the traveler 283, strikes against the bar 289, and throws the nut into the opposite moving screw 278, which reverses the direction of travel of the traveler 283. On the downward stroke of the traveler 283 the pivoted arm 285 strikes against the link 356 which throws the nut out of engagement and the traveler ceases to move. By referring to Fig. 51, the paper is fed over frame 263 under the spring tension bar 289 and between the knife blade 290, which operates in connection with knife 347. Mounted on the traveler is a spring-pressed lever 291 provided with a tail 292 which is adapted to come into contact with striking plate 293. On the upward motion of the traveler 283 the spring-pressed lever 291 takes hold of the paper which is adjacent to the knife 290 and on the downward stroke of the traveler 283 pulls the paper in front of the knife until it is released by the tail 292 striking against the plate 293.

By referring to Fig. 3, it will be readily seen how the knife blade is pressed out of the way of the paper grip 284 against the action of the springs 295. The knife 290 is mounted on 289 by the pins 294 and held in the position shown in Fig. 3 by the springs 295. As soon as the paper grip 284 comes in contact with knife 290, the knife is pressed up against the member 289 against the pressure of the spring which allows sufficient paper to protrude to be engaged by the paper grip. It will be readily seen by referring to Fig. 3, that by turning the crank 272 manually and through the gears 273 the angle between the center line of the paper and the knife is varied, which provides for a longer or shorter wrapper as may be required to wrap the various diameters of articles within the limits of the machine. When the traveler 283 draws the strip of flexible material under the knife the wrapper passes between a fixed roller 296 and swing-roller 297, and through mechanism which will hereafter be described, the roller 297 is brought in rolling contact with roller 296 which takes a hold of the wrapper which has previously been severed from the strip of flexible material and delivers same in curling channel 261 where it is picked up by the rollers 260 rolling on each other and is forced through the channel 261, as will be readily understood by referring to Fig. 31. The forcing of the wrapper through this slot, details in Fig. 32, gives a curl to the paper which aids the wrapper in coiling itself around a roll of coins.

*Wrapping mechanism.*—After the row of coins has been divided into bunches containing the desired number and one bunch has been transferred laterally to the rollers 232 and the wrapper has been severed from the roll of flexible material curled and delivered to the position shown in Fig. 32, it must be rolled around the coins and the ends fastened before the package is completely wrapped. The mechanism for completing this operation will now be described. As previously explained, the means of conveying the desired number of coins laterally along the trough 106 is the threaded tube 227 and arm 231. On the end of arm 231 is an extension 300 adapted to come in contact with a tail 301 of a pivotally mounted lever 302. This lever is mounted to the main frame 1. The other end of this lever is connected by a link 303 to a lifting lever 304 pivotally mounted to the main frame 1, which raises an arm 305 pivotally mounted to a T-piece 306. This T-piece is provided with a slot which straddles the shaft 307 mounted in main frame 1. The member 306 is hung from shaft 308 by link 312, as will be readily understood by referring to Fig. 45. On the lever 305 is a pin 309 adapted to engage the tooth of the ratchet 310 mounted on the gear 311 running free on shaft 307. Slidably mounted on shaft 307 is a clutch 313. Secured to shaft 314 is the lever 315. Mounted on shaft 308 is a segment 316 provided with a notch 317 which swings in the path of the tooth provided on lever 315. The tooth of lever 315 is held against the face of the segment by the spring 318. When the nose engages the notch 317 it throws the clutch 313, securing the gear 311 to the shaft 307. This gear has been continuously running on the shaft and is driven from the main shaft. Pivotally mounted to a depending portion of 106 is the pawl 322 provided with a toe-piece 323 adapted to engage a notch in the spiral gear 324 running free on shaft 325. This gear is revolved by spiral gear 326 mounted on shaft 307. Pivoted to the T-piece 306 at 329, is a lever 330, which is also provided with a pin adapted to engage the teeth of the ratchet 310. This lever is held in its upward position against the action of the spring 331 which is attached to the lever 330 and the T-piece 306. When the toe piece on lever 322 engages its notch in spiral gear 324, it presses down on lever 330 which connects its pin to ratchet 310, shifting the T-piece back to its original position.

When the T-piece is swung to the left, (Fig. 45) by the pin 309 coming in engagement with a tooth of ratchet 310, it rocks the shaft 308 which throws segment 316 downward so that notch 317 is in the path of the tooth of lever 315 mounted on shaft 314. The spring 318 on shaft 314 then throws the clutch 313 and connects the gear 311 to the shaft 307, revolving gear 326 until gear 324 makes one complete revolution. When toe-piece or lever 322 comes into contact with the notch on the gear 324, the lever 322 is pressed against lever 330 by its spring, bringing its pin in engagement with a tooth of the ratchet 310, which throws the T-piece back to its original position and opens the clutch 313. On the outer end of 308, is a crank 340 which is connected through link 341 to a lever 342 pivotally mounted to the main frame 1 and provided on its outer end with a stud 343 adapted to travel in slot 344 which swings the frame 265 carrying the movable coin roller 346 (Fig. 45) until it comes in contact with the top of the bunch of coin. The vertical position of this roller having been previously adjusted to the proper elevation to accommodate the diameter of the coin to be wrapped, the swinging of the frame 265 brings the paper knife 290 against its working edge 347 which severs the wrapper from the roll of flexible material. This is accomplished by the rocking of shaft 348 by reason of the pawl 349 being tripped by its support 350. On the end of pawl 349 is a wedge bar 351 which advances the knife 290, as will be readily understood by referring to Fig. 2. Immediately after the wrapper is severed from the roll of flexible material the pawl 353 is tripped by the support 354 which rocks the shaft 355. Connected to the pawl 353 is a link 356 which is connected to the frame of the paper-handling mechanism by the pivoted arm 357. On the same stud is mounted a lever 358. The downward movement of link 356 throws the nut 286 of the traveler 283 in engagement with the screw 278, as previously described, and thereby bringing into operation the paper feed mechanism. The downward motion of the lever 358 through link 359 rocks cam lever 360 mounted on stud 361, raises lever 362, connected with a clutch 363 slidably mounted on shaft 364. (See Fig. 29.) Through spur gears 464 the shaft 365 is rotated carrying the rollers 260, which as explained before, feed the wrapper through slot 261 and in position to be fed around the roll of coins. The spur gear 464 is mounted on a sleeve carrying a worm 465 which is free to rotate on shaft 364.

On the outer end of shaft 364 is a pulley 366 which is belted to pulley 367 mounted on shaft 307. On the opposite end of shaft 364 is a sprocket 466 which is connected by chain 467 to sprocket 468 mounted on shaft 469. On end of shaft 469 is a bevel gear 470 which meshes with gear 471 which drives the paper feed screws 278, through the spiral gear 282, as previously described. The same transmission revolves the shaft carrying roller 346. For convenience I have shown a belt. Pivotally mounted to frame 265 is spring-pressed lever 369 held against the face of the cam on the worn gear 370 meshing with worm 465 mentioned before. (See Fig. 29.) By the rocking of lever 369 through arm 371 and link 372, the roller 297, is brought into rolling contact with roll 296, the purpose of which is to feed the severed wrapper into the slot 261 and between the feeding rollers 260. Mounted on shaft 364 is pulley 373 which is belted to pulley 374 mounted on shaft 375. (See Fig. 2.) Mounted on shaft 375 are two arms 376 which support a worm shaft 377 which meshes with gear 378. Pivotally mounted on the worm shaft, is a frame 379, which carries the rod 380 on which the crimper blocks 381 slide. The worm shaft 377 is geared to the shaft 375 which, as before explained, is in turn belted to 364. On the side of the worm gear 378 is cam 382. Pivotally mounted on the frame 379 at 383, are two spring-crimper-arms 384 locked together at 385, as is plainly shown in Fig. 1, adapted to follow the cam 382. The extreme ends of these crimper arms 384 engage the crimper blocks 381, as will be readily understood, and draw the crimpers together when the cam 382 revolves. The swinging roller 346 is mounted on shaft 386 and mounted also on this shaft are two rocker arms 387 free to move on the shaft and carrying rod 388, which also serves as a guide rod for the crimper blocks 381. (Fig. 34).

As will be seen by referring particularly to Fig. 1, one of the crimper blocks is directly connected to the arms 384 whereas the other crimper block is adjustable on the sliding rod 388 to which it is attached in an adjustable position with respect to the other crimper block. One of the crimper arms is connected to sliding rod 388. This, as will be readily understood, allows adjustment for the different lengths of the assembled stack and brings the crimper right up to the edge of the package. The crimper arms 384 are made of heavy spring wire coiled around the fulcrum at 383, the object of which is to provide increasing but yielding pressure on the crimp, as will be readily understood. As the crimpers begin to co-act upon the wrapper very little pressure is required to turn the wrapper over on itself at the start, and as this crimp is being completed a greater pressure is required to smooth it down to its desired position and shape. The details of the crimper which I employ are shown in Figs. 37, 38 and 39, and in Figs. 35 and 36 its relative position to the block 381 may be readily understood. In Fig. 37, particularly, are shown the special details of the crimper hook showing the hook proper bent in but one direction and grooved at the point, as at 390. The object of this groove is to provide a channel for the crimp after it is tucked over by the point 391 of the hook. Mounted on the crimper block 381 is a guide 392 which holds the crimper block in line with the package. The details of this are shown very plainly in Fig. 36. The adjustment of this crimping mechanism can be readily seen by referring to Figs. 33 and 34, which show the position of the roll 346 both in contact and out of contact with the coin. In Fig. 34 the crimper is drawn up out of the way of the coins so that they will not interfere when the coins are being moved horizontally from the trough 106 to the fixed rollers 232. The frame 265 is raised and lowered manually by the turning of pinion 269, as before described. The raising and lowering of this frame raises and lowers the crimper. As will be seen by referring particularly to Fig. 33 which shows the extreme faces of the coin in between the fixed rollers 232 and the swing roller 346 it will be necessary to swing the point 391 of the crimper toward the center of the coin. To obtain this result I employ the following mechanism: Slidably mounted on pin 400 in frame 1 is a member 401 which is pivoted to the segmental lever 267 and to a link 402 which is in turn pivoted to frame 265. The difference in the movements caused by the different fulcrums will tend to lift link 402 which will rock shaft 375, arm 376, frame 379, and crimper block 381.

On one end of one of the fixed rollers 232 is housing 405 for the flexible strip 404 which is fastened to a hub 406 and is free to turn inside of the housing. Attached to the housing 405 is an arm 407 which is provided with a slot 408 adapted to engage a pin on a disk 409. This disk 409 is pinned to links 4101 which are in turn pivotally connected to hub 406 and adjusting roller 4111 which is connected by a link 4121 to a rocker arm 4131 pivoted to the main shaft 1, (see Fig. 2.) The other end of said rocker arm, through link 4141 is connected to the segmental gear 267.

As will be readily understood by referring to details in Figs. 43 and 44, it will be seen by rotating member 4111 the hub 406 will rotate thus drawing the tape 404 in and out. In Fig. 43 it is shown in its outward position and in Fig. 44 in its inward position. By adjusting the relative positions of the sides of the slot through which the tape 404 passes, in and out, any curvature of the tape 404 can be obtained. The object of this flexible tape is to guide the point of the wrapper and tuck it in around the roll of coin, as will be readily understood by referring to Fig. 32.

Referring to Fig. 39, which is a detail of my crimper, it will be seen that two portions of the hook are parallel, connected by a curved portion. This curved portion is provided as a means for binding the crimper in its block and will make same readily removable, as will be readily understood.

*Boxing and packing.*—After the wrapper is crimped and the package ready to be boxed, the cam 223, through the segmental gear 221, revolves gear 226 and advances threaded tube 227, pushing the roll of coins out into the box which is provided for the purpose.

On the return of the threaded tube 227, the arm 231 is in a vertical position and comes in contact with the heel of a lever 410 pivotally mounted to the frame 1. The lower end of this pivoted lever is a yoke adapted to operate the clutch 411 half of which is slidably mounted on shaft 412. The shaft 412 is telescoped into the other half of clutch 411 which is fast to gear 413' mounted on shaft 480, which is driven through bevel gears 481 from main shaft 5. As soon as the lever 410 is pushed downward the clutch 411 is closed and the shaft 412 commences to revolve. On the outer end of shaft 412 is a worm 413 and gear 414 which operate rollers of the printing mechanism. The printing mechanism may be any well-known stamping type. I have shown a roller with a concave periphery on which is secured the rubber type to be used. Alongside of worm gear 414 is a cam face with a notch 415. Mounted to the yoke 410 is a rod 416 adapted on its end to engage the notch 415. When the rod 416 is in engagement with notch 415, the clutch 411 is open and it is provided as an automatic means of opening the clutch 411.

After the paper has been crimped against the face of the coins the package is advanced by the rod 231 to the end of the trough 106 which is inclined downward more or less, as shown in the right of the assembly view, Fig. 1, and comes in contact with roll 601 and roll 602. These rolls are suitably mounted in bearings in the main frame and are connected together through the bevel gears 603. On the shaft-carrying roll 602 is the worm 414 and cam provided with notch 415. As will be readily understood by referring to Figs. 63 and 64, it will be seen that when the roll of coins comes in contact with the rolls 601, 602 it stops until the clutch 411 is thrown into engagement, and the shaft 412 commences to revolve; which, through the worm and worm gear, revolves the roll 601 and roll 602, drawing the package of coins between them. In the path of the package is a roller 604 mounted on a lever 605 which swings on the hub 606 on shaft 607, on which roll 601 is keyed and held into position by the thumb screw 608. This roll 601 is easily changed and contains on its concave periphery the type for printing the package. This type may be inked by the ink roll 609, as will be readily understood by referring to Fig. 63.

On the back of roll 601 is a cam 610 slidably mounted on pins 611 working against the spring 612. On the face of cam 610 is a flange 613. In the hub 606 is a pin 614 in engagement with slot 615 of the lever 605. The swinging of lever 605 moves it to the right which advances the cam face 610 into the path of the link 616 and in making its revolution it depresses the link 616, operating against spring 621. Link 616 is mounted through swing levers 617 to the main frame of the box-handling mechanism. The upper lever 617 is secured to shaft on which is mounted two arms 618, connected together by a pin 622 which passes through slot 623 in L-shaped lever 619 which is in turn pivotally mounted on shaft 620 and is provided with an end adapted to engage the slots in the slotted plate 624. The shaft 620 does not turn but is free to slide laterally in its bearing. The L-lever 619 moving in the slots in the plate 624 works against cam faces for the operation of two clutches which moves the box vertically and laterally. When the L-lever 619 works in slot 625, it moves the box to the right horizontally and when the L-lever operates in slot 626 it moves the box to the left. When the L-lever operates in the center slot 627 it moves the box vertically. This mechanism is shown in perspective in Fig. 65. Slidably mounted against the slotted plate is the link 628 provided with a center slot 629 and two cam faces 630. The end of this link is pivoted to a lever 631 which is pivoted to the main frame at 632. The upper end of 631 is pivoted to lever 633 which is in turn mounted on shaft 634 carrying lever 635 and operates the clutch 636 either to the right or to the left. This action varies the movement of the box horizontally and will be explained later. Also slidably mounted in front of the link 628 is a link 638 provided with a cam face 639 adapted to move in front of the slot 627. The link 638 is pivoted to lever 640 which is mounted at 632 to the main frame. The upper end of this lever 640 is connected to 641 which is mounted to a quill 642 which turns around shaft 634. On the other end of the quill is mounted a lever 643 which carries the clutch 644 and swings it to the right which regulates the movement of the box vertically. Mounted on the same shaft as the worm 414 is a gear 650, which meshes with gear 651. Gear 651 is mounted on shaft 652 with beveled gear 653 which meshes with beveled gear 654 on vertical shaft 655. On the upper end of shaft 655 is a gear 656 which meshes with gear 657 mounted on shaft 658. Shaft 658 is mounted in suitable bearings 659 in a portion of the main frame. On shaft 658 is securely mounted gear 660 which meshes with gear 661 mounted loosely on shaft 662. On the back of gear 661 is a clutch 663 adapted to be engaged by the clutch 644. The shaft 662 is mounted in suitable bearings 664 and on each end are provided beveled gears 665 which mesh with gears 666 mounted on the upper end of shafts 667 which are threaded on the lower end at 668 which turn in nuts 669 provided therefor in the box-carrying frame 670.

Slidably keyed on shaft 658 is a clutch 636, as has been explained before. Loosely mounted on shaft 658 are two beveled gears 671 meshing with gear 672 and as the clutch 636 is thrown to the right or left the direction of rotation of gear 672 is determined and regulates the direction of the box in a horizontal position. The gear 672 is mounted on the upper end of shaft 673 which is broken away as shown in the drawing, Fig. 62. On the lower end of shaft 673 is a worm 674 carried in bearings 675 on the box-carrying frame 670. The worm is free to move laterally on shaft 673 and meshes with worm gear 676. On the same spindle with the worm gear 676 is the spur gear 677 which engages with rack 678 mounted on the frame 680 which slides in suitable bearings 681 on the box-carrying frame 670.

For convenience I employ a box 683 provided with studs 684 mounted in the bottom thereof, extending part way to the top of the box. These studs are suitably spaced so that when the coin packages stand in the box the packages do not touch; this is to avoid the blurring of the printing in case the printed surface rubs against one of the preceding packages. For every size coin counted, a different box must be employed and of course, the pins 684 are spaced accordingly. These boxes are placed in position on the frame 680 and are securely fastened thereto by any desired means. The one shown in the drawing is a simple L-piece 685 which is fastened to the frame in its desired position by the thumb screw 686. The studs 684 are tapered at the top to facilitate the sliding of the coin package into the box. To regulate the vertical and horizontal movement of the box to accommodate coins of different diameters from about five-eighths of an inch of the silver five-cent piece to the inch and a half of the silver dollar, the length of the active face of the cam 610 must be varied. Inasmuch as the face value of the coins change with different packages it will be readily understood that it will be necessary to change the printing roll 601 and carrying the proper cam 610 on its face the amount of throw of the box is therefore accordingly regulated.

In order to move the box so that the proper space for the package will be under trough 106 from which the finished package is delivered, I provide mechanism which will hereinafter be described. Slidably mounted in the main frame is the shaft 700 which is prevented from turning. On the extreme left-hand end of this shaft is a screw thread 701, on which turns a nut provided with gear teeth 702. This gear meshes with rack 703. At the upper end of the rack is a gear 704 meshing with the teeth of the rack which is mounted on a nut free to move on thread 705 on the end of shaft 620 on which is slidably mounted the L-lever 619, as has been previously described. On shaft 700 is a quill 706 provided with a right and left-hand thread which provide a means to vary the distance between the contact levers 707 through the gears 708 and 709 (see Fig. 66). Mounted on the same shaft as gear 709 is a gear 710 which meshes with rack 711 mounted on the movable block 712 (see Fig. 67) which carries the spindle 607 and roll 601. This block is adjusted vertically for the proper diameter of the coin package by the thumb screw 713. The object of these two contact arms being adjustable is to provide a means for timing the movement of the box. The box 683 is held in position by an L-clamp, as before described and as the box moves to the right the clamp comes in contact with striking arm 707 which throws the shaft 700, turning gear 702 by means of the threaded portion 701 and through rack 703, gear 704, thread 705, the shaft 620 is moved to the right. On shaft 620 are fixed two collars 716 and springs 717 (see Fig. 62). These springs hold the L-shaped lever 619 in its normal position which is midway between the two collars 716. The position of the sliding shaft 620 determines which slot in the slotted plate 624 the L-lever is to slide (see Fig. 65), as before described. This mechanism determines the movement of the box to the right or left and down. Mounted on a shaft 720 is an arm 721 provided with a lip 722 which hangs down in the path of the L-shaped piece 619. This shaft 720 is free to slide in suitable bearings in the main frame and has a lateral movement limited by the shoulders 7221 on the end of the shaft. The lever 721 is held, in its normal position by the springs 723, directly over the slot 627. When the shaft 620 is moved to the right, spring 717 at the left of 619 is compressed until the L-shaped lever 619 is free from its slot in the slotted member 624 by action of cam on roll 601 through link 616, levers 617 and 618, and then it is suddenly moved to the right by the action of the compressed spring until it comes in contact with the lip 722 of the lever 721 (see Fig. 63), which overcomes the pressure of spring 723 and moves shaft 720 to the right up against shoulder 7221. Then the L-piece 619 is in position to go into slot 627 (see Fig. 65). As soon as it goes into slot 627 it frees the lever 721 and releases the spring 723 which has been compressed and the lever 721 goes back to its normal position which is directly over slot 627. When the lever 619 comes out of engagement with slot 627, the spring 717 being still compressed, pushes it still farther to the right and allows it to go into slot 626 and the direction of the motion of the box is thereby reversed as previously described.

The operation of the machine is as follows: The coins to be wrapped, which may be of promiscuous size, are dumped in the hopper, shown in the upper left-hand corner of Fig. 1, and fall upon themselves in front of the reciprocating notched plates 34 which are reciprocated by the friction rollers 32. The coins falling in the notches 35 are advanced up the incline and under the gage 48. Should any coin be in advance of the correct position of the coin in the notch 35, they are turned over on themselves by the apron 50 and are thrown back into the hopper, and come up again in their turn. If the coin is bent and does not pass under the gage, the member 34 slips between the friction rolls until the return stroke. The rest of the notched members continue their stroke until they deposit their coin into the holes 42 of the adjustable plate. The coins fall through on shoulder 67 and slide off into the hopper 68, as previously described. If a coin of smaller diameter than those decided to be wrapped is bottomed in the notch 35, it is not advanced far enough to fall in the hole 42 and on the downward stroke of the members 34 the swing plates 56 and 63 swing downward, depositing the coins of too small a diameter into receptacles 60 and bent coins into receptacle 69 provided for the purpose. This operation is repeated until all of the coins of same denomination are advanced and are dropped through the holes 42 and all of the coins are taken out of the hopper. It will be readily understood that coins of larger dimensions than the ones to be segregated will also be deposited in receptacle 69 or 60. If the larger dimension coin passes under the gage 47, it will not drop through the hole 42 and in that event they will be deposited in the receptacle 60. The coins having been delivered in perfect state to hopper 68, fall by gravity in between plates 72 and 73 until they are advanced by the dogs 105, as heretofore described. The agitation of the sides and bottom of this hopper absolutely prevents any clogging of the coins in the guideway and is entirely automatic, and the guideway being open on the bottom, dirt will not accumulate, as will be readily understood. When the coin is advanced by the gripping dogs it pushes member 159 downward. This starts in operation the mechanism for shifting the coin to the right, as is shown plainly in Fig. 20. This operation is repeated until the desired number of coins are stacked in the trough 106 under resilient member 131 and are securely held together thereby. By referring particularly to Fig. 22 a reciprocating rack 173 is shown on which is adjustably mounted a dog 175 and a stationary dog 174. The adjusted position of 175 determines the number of coins to be stacked and also reverses the motion of the bar and also throws in operation the dividing mechanism shown in perspective in Fig. 70. The next coin, which is the first coin of the succeeding bundle, further advances the dividing mechanism, until the stack of coins is advanced laterally until they come into position to be wrapped. While being thus transferred the lever 301 is depressed which sets in operation the wrapping mechanism, as before described. The wrapper having been adjusted at the proper angle to the knife, is severed from the roll and fed between the curling plates 261, which gives the proper curl to the wrapper. It is then guided around the roll of coins and the crimpers which are driven together by the cam 382 turn the paper protruding at each end of the package over on itself to form a crimp up against the face of the coin exposed on the end. As soon as the crimp is complete, the crimpers return to their normal position and are drawn up out of the way through the swinging of the movable roll 386. The cam 223 completing its revolution, advanced still farther the arm 231 and the finished package is forced along trough 106 until it comes to the inclined portion of the said trough where it slides by gravity until it comes in contact with the printing and feeding rolls of the boxing device. On the return stroke of the transfer mechanism lever 410 is depressed, which throws in clutch 411 and starts in operation the printing rollers. The package of coin having been delivered to the rollers by gravity, is picked up by the rolls and forced through. The passage of the coin package through these rollers sets in operation the box-handling mechanism through the roller 604, as previously described. Each space in the box provided for the package of coin is placed in position to receive its package and the box is moved to the next adjusted position until it is full. When the box is thus automatically filled and there are still some more coins of the same denomination in the machine to be counted and wrapped, it will have to be removed manually.

To adjust the machine to a desired size of coin: (1.) Move lever 113 Fig. 1 to an indicating mark. This adjusts the separating and feeding mechanism. (2.) Adjust the left hand crimper 381 on rod 388 Fig. 1 to the length of the package. (3.) Adjust the upper printing roll 601 Fig. 1 by screw 713, said roll is removable and machine is equipped with several rolls carrying type which prints the value of the package for which said roll is intended. (4.) In Fig. 22, adjust the movable toe-piece 175 mounted on the recording-bar 173. This determines the number of coins in a package. (5.) In Fig. 2, turn the gear 266. This adjusts the upper roll 346 to the diameter of the coin. (6.) In Fig. 2, turn the crank 272 until the proper angle of the paper is secured. In Fig. 3, turn the crank 2901 which moves the knife 290 to cut the proper width of wrapper.

In adjusting the machine for different packages it sometimes occurs that some of the foregoing adjustments need not be changed. For instance if the machine is adjusted to handle half dollars in packages of $10.00, and it is desired to handle nickels in packages of $1.00, the adjustment No. 4 need not be changed since there is the same number of coins in each package. Also in changing from a package of fifty pennies to a package of twenty-five pennies, adjustment No. 6 need not be changed, since this adjustment determines the length (not width) of the wrapper, and the same length is evidently required for both packages. Also all these adjustments may be connected to one indicating lever for a single adjustment if desired by any well known means.

All through the description we have specifically mentioned coins. It will be readily understood that disks of any thickness and diameter can be handled in a machine of this character and that it does not in any way affect the invention. The mechanism herein illustrated and described is in the form in which I desire to construct it but any modifications may be made without departing from the salient features of my invention, the principal feature of which is a machine for the automatically handling of coins that will take the coins of all kinds, sort them according to a similar kind, wrap them in packages containing a definite number, and conveniently box the packages for use. This is all done in my machine with one mechanism for entire handling and it is adjustable for all denominations. I use the same roll of paper from which is severed a wrapper of proper size for the particular package to be wrapped.

Having thus described my invention, what I claim as new and desire to secure by Letters Patent is,—

1. In a machine of the class described, in combination, a hopper adapted to receive coins of assorted sizes, means to automatically extract all the coins from the hopper, means to segregate a particular size and assemble them in a row, means to deposit all other sizes in a single receptacle, the before-mentioned means being simultaneously adjustable as to size on which it operates so that rows of different sizes may be assembled, means for taking from the row a stack containing a desired number, means adjustable as to size on which it operates for wrapping the stack.

2. In a machine of the class described in combination, a hopper adapted to receive coins of assorted sizes provided with two auxiliary receptacles, means to automatically extract all coins from the hopper, means to segregate a predetermined size and assemble them in a row, means to deposit all other sizes in one of the before-mentioned receptacles, means to deposit all mutilated coins in the other before-mentioned receptacle, the said means being adjustable as to size on which it operates so that rows of different sizes may be assembled, means manually adjustable as to size on which it operates for dividing the articles into bunches containing a predetermined number and means for wrapping the said bunches.

3. In a machine for handling articles of various diameters; means for assembling articles in a bunch, said means being adjustable so that articles of different sizes may be assembled; a wrapper forming mechanism provided with an adjustable knife and a pivotedly mounted wrapper holder, with means to vary the angle of the holder to the knife, so that wrappers of various sizes may be severed; means to coil the wrapper around the bunch.

4. In a machine of the class described, mechanism to segregate coins of similar size from a mass of mixed coin, means for dividing the selected size into stacks containing a definite number; means for delivering a wrapper, adjustable as to length of stack, from a single roll of flexible material, means for rolling the wrapper around the stack, and a crimping mechanism whereby the edges of the wrapper are turned inward to lock the wrapper over the end of the stack.

5. In a machine of the class described, mechanism to separate mixed articles according to similar size and assemble them in rows, the said mechanism being manually adjustable for any size so that rows of different sizes may be assembled, a single means manually adjustable as to size to divide the particular size thus handled into stacks containing a desired number, means manually adjustable for delivering a wrapper the proper size as to length and diameter of stack from a single roll of flexible material and a single means for wrapping the desired number of the selected size.

6. In a machine for handling coins, in combination; mechanism to separate mixed articles according to similar sizes and assemble them in rows, the said mechanism being manually adjustable as to size on which it operates so that rows of different sizes may be assembled; means for taking from the row a bunch containing a definite number, means for making and delivering a wrapper adjustable as to size of bunch from a single roll of flexible material, means for coiling the wrapper around the bunch of coin, means for turning the ends of the wrapper inward to form a crimp, means for printing the face value of the bunch upon the wrapper, means for advancing the bunch to the packing mechanism and a packing mechanism operated by the advancing bunch, whereby the bunches will be automatically packed in a receptacle.

7. In a machine of the character described, in combination; a segregating and feeding device, a reciprocating stacking device provided with means for determining the number to be stacked, an intermittent transferring device set in operation by passage of a coin, an intermittent wrapping device set in operation by the aforesaid transferring device, an intermittent printing device set in operation by the transfer device.

8. In a machine for handling coins or the like, a bunching mechanism, a wrapping mechanism, in combination, with a crimper formed of a piece of round wire bent into a hook and provided with a groove on the inner face of the extreme end of the hook.

9. In a machine of the class described, means for assembling articles in stacks, in combination with a wrapper-forming mechanism, and means to coil the wrapper around the stacked articles, a mechanism provided with two crimper hooks operated in both directions by a single cam whereby the crimpers are drawn toward the face of the stacked articles with an increasing but yielding pressure.

10. In a machine for handling coins, in combination, means for assembling coins said means being manually adjustable as to size so that coins of different sizes may be assembled in bunches, a wrapper-forming mechanism, including means for feeding a strip of flexible material from a single roll, severing the same into wrappers of proper size for the bunch assembled and curling the latter to adapt them to be applied to the bunch; means for coiling the wrapper around the bunch and means operated by one cam for crimping the ends of the wrapper.

11. In a machine for handling articles of various diameters, means for assembling articles in a bunch, said means being adjustable so that articles of different sizes may be assembled, a wrapping mechanism provided with means for feeding a strip of flexible material from a single roll, including means for severing a wrapper of varying length and width therefrom, and means for coiling the same around the bunch.

12. In a machine of the class described, means to separate from a lot of mixed articles, articles according to similar size; a trough; means for vertically feeding the articles into said trough, means for the lateral transfer of the articles, means for dividing the articles into stacks containing a predetermined number, a wrapping mechanism, and means set in operation by the dividing means for controlling said wrapping mechanism.

13. In a machine of the class described, an assembling and wrapping mechanism, adjustable for operating upon a plurality of sizes of coin; in combination with a mechanism for segregating from a mass of coins, coins of a particular group and delivering the same to the first mentioned mechanism, comprising friction driven plates, provided with notched ends.

14. In a machine for handling coins, a wrapping mechanism comprising means for making a wrapper, means for curling the same, two fixed rolls in a horizontal plane, and one adjustable roll adapted to grip the stack of coins and feed the wrapper around the coins.

15. In a machine for handling coins or the like, a crimper hook formed of a piece of round wire, bent into a hook on one end and provided with a groove on the inner face of the extreme end of the hook, the opposite end of the wire paralleling the straight portion of the hook end, the connecting portion being curved.

16. In a machine for handling coins, a wrapping mechanism comprising means for making a wrapper, means for curling the same, a swing lever provided with an adjustable fulcrum, two rolls in a horizontal plane with fixed bearings, one roll mounted on the swing lever.

17. In a machine for handling coins, in combination, mechanism to separate mixed coins according to similar size; means to handle the size thus separated and place them in a row, said means adjustable manually so that coins of different sizes may be handled; means for dividing the coins into bunches containing a definite number, means for making and delivering a wrapper of the proper size for the bunch assembled from a single roll of flexible material, means for coiling the wrapper around the bunch of coin, means for turning the ends of the wrapper inward to form a crimp, a transfer device to advance the package to the packing mechanism, means set in operation by the transfer device for printing the face value of the bunch upon the wrapper, and a packing mechanism set in operation by the advancing of the package.

18. In a machine of the class described, a wrapping mechanism in combination with means for assembling articles in bunches and delivering the same to said mechanism, an adjustable reciprocating releasing bar to regulate the number of articles in the bunch, means for moving said bar by steps in either direction and means for changing its direction by the movement of the bar on the last step.

19. In a machine for counting and wrapping coins or the like, in combination with means for assembling the articles in a bunch, means for delivering a wrapper to the bunch comprising in combination, a carrier for a roll of flexible material adjustable so that the axis of the roll may be varied with the vertical, a means for severing a wrapper from the roll of flexible material, a feed mechanism provided with means for engaging the end of the flexible material and advancing the flexible material in front of the severing means, and means for inclosing and crimping the wrapper around the bunch.

This specification signed and witnessed, at 911 Flat-Iron Building, in the city of New York, this 4th day of January, A. D., 1909.

RODNEY BRADFORD WARE.

In the presence of—
 EDWD. VAN WINKLE,
 MARGUERITE ROSS.